US010228884B2

(12) United States Patent
Sherlock et al.

(10) Patent No.: US 10,228,884 B2
(45) Date of Patent: Mar. 12, 2019

(54) ISSUING WRITE REQUESTS TO A FABRIC (71) Applicant: HEWLETT PACKARD ENTERPRISE DEVELOPMENT LP, Houston, TX (US)

(72) Inventors: Derek Alan Sherlock, Ft. Collins, CO (US); Shawn Walker, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 58 days.

(21) Appl. No.: 15/453,212

(22) Filed: Mar. 8, 2017

(65) Prior Publication Data
US 2018/0260160 A1 Sep. 13, 2018

(51) Int. Cl.
G06F 12/00 (2006.01)
G06F 13/00 (2006.01)
G06F 3/06 (2006.01)

(52) U.S. Cl.
CPC .......... *G06F 3/0659* (2013.01); *G06F 3/0604* (2013.01); *G06F 3/0652* (2013.01); *G06F 3/0685* (2013.01)

(58) Field of Classification Search
None
See application file for complete search history.

(56) References Cited

U.S. PATENT DOCUMENTS

| 7,877,748 | B2 | 1/2011 | Kwiat et al. |
| 8,290,899 | B2 | 10/2012 | Webman et al. |
| 9,075,952 | B2 | 7/2015 | Niell et al. |
| 9,244,839 | B2 | 1/2016 | Sakthivelu et al. |
| 9,262,225 | B2 | 2/2016 | Davis et al. |
| 9,747,034 | B2* | 8/2017 | Clark ..................... G06F 3/061 |
| 2008/0059713 | A1* | 3/2008 | Begon ................ G06F 12/0804 711/133 |
| 2009/0037619 | A1* | 2/2009 | Fan ..................... G06F 13/4027 710/55 |

(Continued)

OTHER PUBLICATIONS

Dr. David J Greaves, "System on Chip Design and Modelling," 2015, pp. 2-5, 8-9, Lecture Notes, University of Cambridge, UK, Available at: <cl.cam.ac.uk/teaching//1516/SysOnChip/materials.d/socdam-notes00.pdf>.

*Primary Examiner* — Sean D Rossiter
(74) *Attorney, Agent, or Firm* — Trop, Pruner & Hu, P.C.

(57) ABSTRACT

A system comprises a processor, a memory fabric, and a fabric bridge coupled to the memory fabric and the processor. The fabric bridge may receive, from the processor a first eviction request comprising first eviction data, transmit, to the processor, a message indicating the fabric bridge has accepted the first eviction request, transmit a first write comprising the first eviction data to the fabric, receive, from the processor, a second eviction request comprising second eviction data, and transmit a second write comprising the second eviction data to the fabric. Responsive to transmitting the second write request, the fabric bridge may transmit, to the processor, a message indicating the fabric bridge accepted the second eviction request, determine that the first write and the second write have persisted, and transmit, to the processor, a notification to the processor responsive to determining that the first write and the second write have persisted.

17 Claims, 7 Drawing Sheets (56) References Cited

U.S. PATENT DOCUMENTS

| | | | | |
|---|---|---|---|---|
| 2014/0052907 A1* | 2/2014 | Starr | .................... | G06F 3/0613 |
| | | | | 711/111 |
| 2014/0201425 A1* | 7/2014 | Clark | ..................... | G06F 3/061 |
| | | | | 711/103 |
| 2018/0081567 A1* | 3/2018 | Goel | ..................... | G06F 3/0613 |
| 2018/0113804 A1* | 4/2018 | Hsu | ...................... | G06F 3/0608 |

* cited by examiner

ISSUING WRITE REQUESTS TO A FABRIC

BACKGROUND

A computing device may comprise a processor. The processor may be coupled to a memory.

BRIEF DESCRIPTION OF THE DRAWINGS

The following detailed description references the drawings, wherein.

DETAILED DESCRIPTION

A computing system, such as a high performance computing (HPC) system may feature a number of nodes. The computing system may comprise processors (e.g. central processing units (CPU's)) that are coupled to a memory fabric. The processor may be coupled to higher levels of an ordered memory hierarchy such as ordered level one (L1), level two (L2), and level three (L3) caches, and/or locally coupled random access memory (RAM).

In systems with larger memory pools, the processor may also be coupled to a fabric bridge. The fabric bridge writes data, via a memory fabric, to a media controller. The media controller writes data to non-volatile memory coupled to the media controller. The memory fabric connects the fabric bridge to the media controller via interconnects. However, the memory fabric may be unordered and/or may be non-posting. That is, the memory fabric may send an acknowledgement back to the fabric bridge responsive to completion of a write bound for the media.

In system in which part of the memory hierarchy is posted, and part of the memory hierarchy is non-posted, there may be a number of issues with enabling a processor to work properly with both posted and non-posted levels of the memory hierarchy.

As an example, a processor may write data to the L1, L2, and/or L3. The CPU expects that the cache controller handles proper ordering of writes to the cache hierarchy. The processor also does not expect a response from the posting levels of the memory hierarchy. However, if the processor attempts to write data to an unordered, non-posted level of the memory hierarchy, e.g. to an unordered memory fabric, writes may not be accepted or persisted (e.g. written) to non-volatile storage by a media controller in the order they were issued to the media controller by the processor. Having the writes persist out of order may result in erroneous or unexpected program execution, e.g. if there were a dependence upon a particular write ordering.

Additionally, because writes to the fabric may not be persisted to memory by a media controller coupled to the fabric in the order they were issued, a processor may execute an instruction, referred to as a barrier instruction. The barrier instruction causes the processor to verify that issued instructions issued before the barrier instruction, such as writes, complete (e.g. are persisted to non-volatile storage) before the processor executes subsequent instructions. If a processor executes a barrier instruction, the processor waits for an acknowledgement for each of the writes issued before the barrier instruction, wherein each received acknowledgement indicates that the write has been persisted to non-volatile storage, by the media controller.

The time between the processor issuing a write and receiving an acknowledgement may be quite lengthy. Because the processor must track each write that is pending until a corresponding acknowledgement is received, the amount of logic and/or storage that the processor uses to track the outstanding writes becomes prohibitively large. Additionally, because the processor may have to track too many outstanding writes, the time that each write request is tracked before receiving an acknowledgement is too long.

To alleviate the problem of tracking an excessively large number of outstanding write requests, this disclosure proposes converting the interface between the processor and the fabric bridge from a non-posting interface to a posting interface. More particularly, the techniques of this disclosure change the behavior of the fabric bridge from: generating a write acknowledgement responsive to a media controller persisting a write to: generating a write acknowledgement responsive to the fabric bridge accepting a write. Once the fabric bridge has acknowledged accepting the write, the processor may issue another write. Allowing additional writes to be issued to the fabric bridge in response to an acceptance acknowledgement rather than in response to a persistence acknowledgement may improve write throughput.

The techniques of this disclosure describe an interface between a processor and a posting fabric bridge coupled to a posting memory fabric that improves write bandwidth. More particularly, the techniques of this disclosure describe that a processor may send a write request to the fabric bridge, e.g. in the form of an eviction request of a cache line. An eviction request may comprise a flush or a writeback from the memory hierarchy.

The fabric bridge may issue a write request to a media controller via the posting memory fabric responsive to receiving the eviction request to write the flushed data to the fabric. Responsive to the fabric bridge accepting the eviction request, the fabric bridge may transmit an indication to the processor that the fabric bridge has accepted the eviction request. The processor may continue to issue additional write request to the fabric bridge responsive to receiving the acceptance. indication.

To implement a checkpoint sequence, which prevents a processor from executing subsequent instructions until prior evictions have become persistent, the processor may issue a barrier instruction followed by a request to read a high-speed register (HSR) of the fabric bridge. The register read request causes the fabric bridge to wait for all eviction requests that it accepted before the read request to be persisted to non-volatile memory by the media controller, and to notify the processor when the writes, which were pending before the register read request was accepted, have all completed (e.g. persisted).

Responsive to the processor receiving the notification from the fabric bridge that all eviction requests issued before the register read have been persisted, the processor may continue to execute instructions that that occur after the checkpoint sequence. Instructions that occur after the checkpoint sequence may include store instructions, whose effects will not take effect until after the checkpoint sequence has completed. By utilizing a register read request as part of a checkpoint sequence, a processor may implement an ordering mechanism, e.g. by ensuring that certain writes complete before the barrier instruction finishes execution, and certain writes are not issued until after the processor finishes executing the checkpoint. sequence.

In this disclosure, responsive to accepting a register read request, the fabric bridge assigns a group of writes that were accepted by the fabric bridge since the fabric bridge last received a previous register read request to an epoch. The fabric bridge may track multiple epochs simultaneously. The fabric bridge tracks the pending writes in each epoch until the fabric bridge determines that all the writes of an epoch have been persisted to non-volatile storage. Responsive to determining that all the writes of an epoch have been persisted to non-volatile storage, the fabric bridge transmits a completion notification to the processor.

Figure 1:
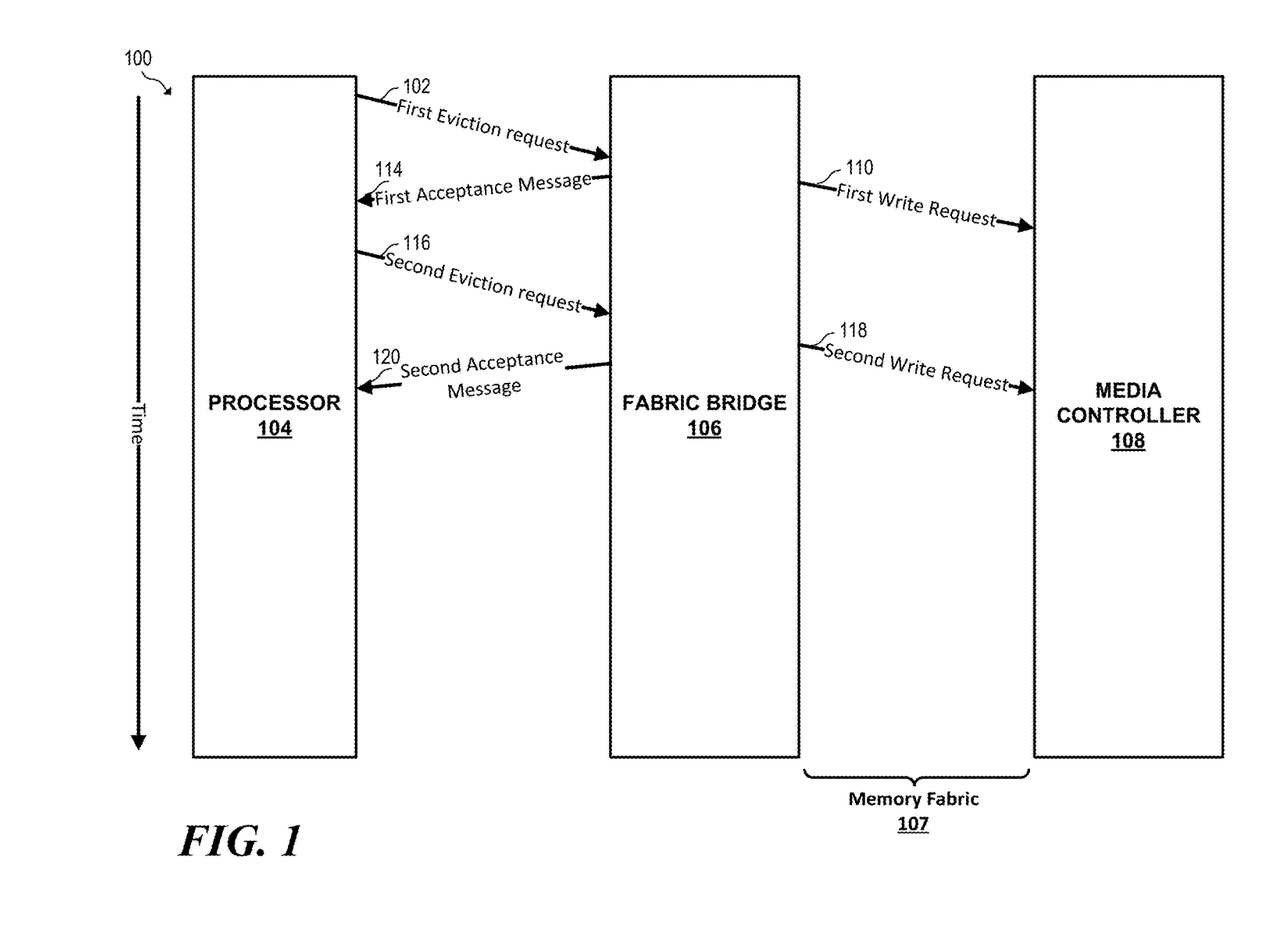
FIG. 1 is a bounce diagram of an example computing system for issuing write requests to a fabric.

FIG. 1 is a bounce diagram of an example computing system 100 for issuing write requests to a fabric. System 100 comprises a processor 104, fabric bridge 106, and a posting fabric 107. Processor 104 may comprise at least one of a central processing unit (CPU), core of a CPU, digital signal processor (DSP), application-specific integrated circuit (ASIC), field programmable gate array (FPGA), or combination thereof. In various examples, processor 104 may be virtualized.

Processor 104 may comprise a memory controller that is coupled to an ordered and/or posting memory hierarchy in some examples. Processor 104 is coupled to fabric bridge 106. Fabric bridge 106 may comprise logic, a programmable logic device (PLD), field programmable gate array, an application-specific integrated circuit (ASIC), instructions executed by a processor, or any combination thereof. In various examples, fabric bridge 106 may be virtualized.

Fabric bridge 106 is coupled to memory fabric 107. Memory fabric 107 may comprise a posting fabric that is coupled to a media controller 108. Media controller 108 is coupled to persistent storage, e.g. non-volatile memory in various examples. Media controller 108 handles ordering and tracking of reads and writes to the persistent storage. In various examples, memory fabric 107 may comprise a fabric such as GEN-Z, Quickpath Interconnect (QPI), INFINI-BAND or the like. Memory fabric 107 may comprise point-to point interconnects, which may be redundant in various examples.

In the example of FIG. 1, processor 104 may issue memory requests to the memory hierarchy. In some examples, processor 104 may issue eviction requests. An eviction request may comprise a flush of a cache line, in which a cache line is automatically flushed to persistent storage by the cache hierarchy, or a writeback request, in which data is explicitly flushed in response to an instruction by the processor.

In the example of FIG. 1, processor 104 issues first eviction request 102, which may comprise a flush or a writeback. Fabric bridge 106 receives first eviction request 102. First eviction request 102 may comprise first eviction data in various examples. Responsive to receiving first eviction request 102, fabric bridge 106 generates first acceptance message 114. As will be discussed in greater detail below, processor 104 may use acceptance messages, such as first acceptance message 114 to determine whether a barrier instruction has successfully executed.

Also responsive to receiving first eviction request 102, fabric bridge 106 generates a first write request 110. First write request 110 comprises first write data. The first write data may be based on or may comprise the first eviction data. Fabric bridge 106 transmits first write request 110 to posting fabric 107 via an interconnect or interconnects.

Fabric bridge tracks outstanding write requests to posting fabric 107. As discussed in greater detail herein, fabric bridge 106 may track outstanding write requests based on receiving acknowledgements (not pictured in FIG. 1) from memory fabric 107.

At some other time (e.g. before or after issuing first eviction request 102), processor 104 issues second eviction request 116 comprising second eviction data. Fabric bridge 106 receives second eviction request 116 comprising the second eviction data. Responsive to receiving the second eviction request 116, fabric bridge 106 generates second acceptance message 120 and transmits second acceptance message 120 to processor 104. Also responsive to receiving second eviction request 118, fabric bridge 106 generates a second write request 118 based on the second eviction data. Fabric bridge 106 transmits second write request 118 to media controller 108 via posting fabric 107.

In some examples, as part of executing a checkpoint sequence, processor 104 may execute a barrier instruction. The barrier instruction attempts to ensure that all instructions issued before the barrier instruction complete before executing any instructions subsequent to the barrier instruction. In the example of FIG. 1, processor 104 tracks each transmitted eviction request, and determines whether a corresponding completion message has been received from fabric bridge 106.

In this manner, FIG. 1 represents a system in which fabric bridge is to: receive, from a processor a first eviction request comprising first eviction data, transmit, to the processor, a message indicating the fabric bridge has accepted the first eviction request, transmit a first write comprising the first eviction data to a media controller, receive, from the processor, a second eviction request comprising second eviction data, and transmit a second write comprising the second eviction data to the media controller.

Responsive to the fabric bridge accepting the second eviction request, the processor bridge may: transmit, to the processor, a message indicating the fabric bridge accepted the second eviction request.

Figure 2:
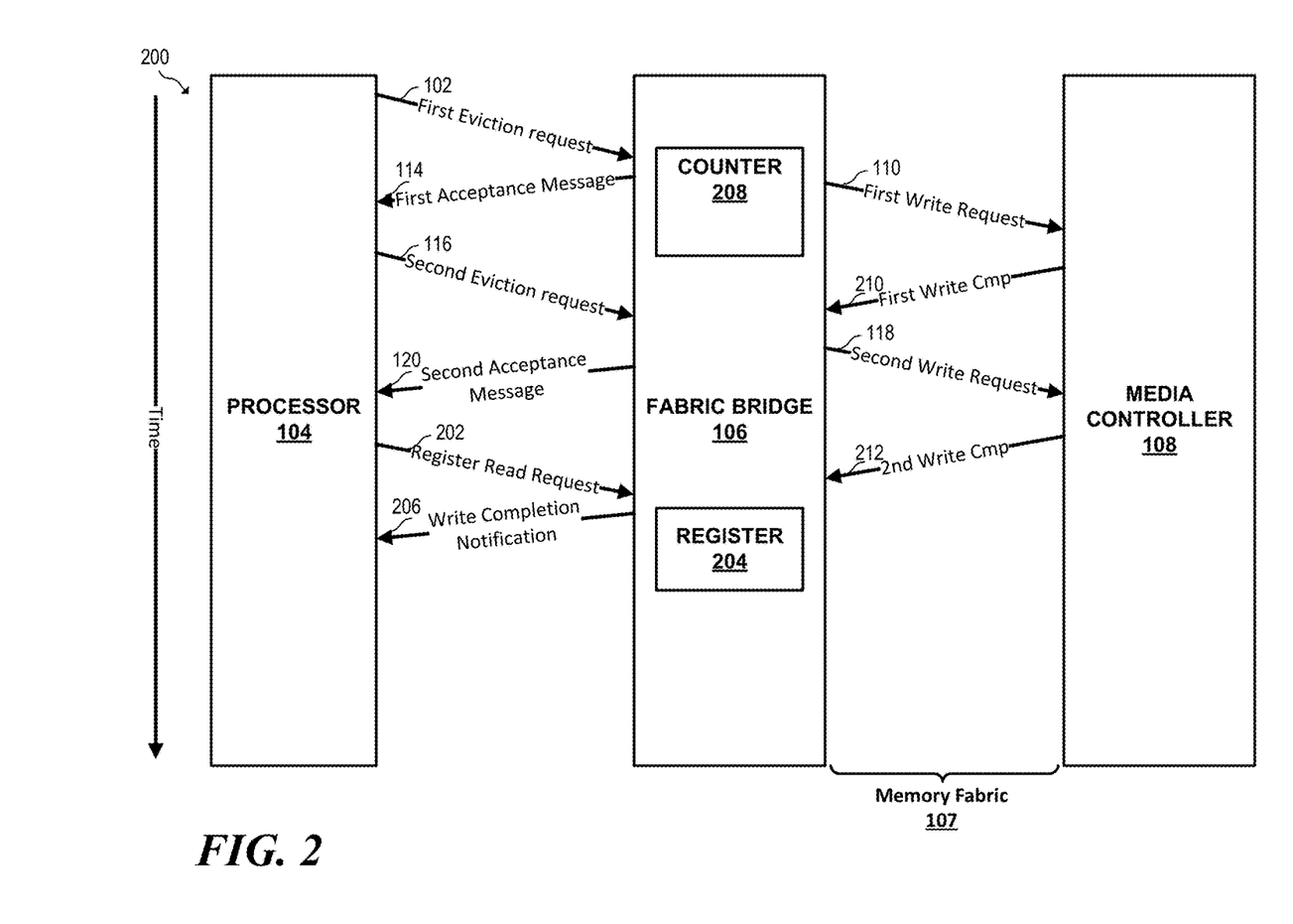
FIG. 2 is a bounce diagram of another example computing system for issuing write requests to a fabric.

FIG. 2 is a bounce diagram of another example computing system 200 for issuing write requests to a fabric. System 200 may be similar to system 100 of FIG. 1. System 200 comprises a processor 104, fabric bridge 106, a posting fabric 107 and a media controller 108. In the example of FIG. 2, fabric bridge 106 comprises a counter 208, and a register 204. Although a single counter and register are illustrated, fabric bridge 106 may comprise multiple counters and/or registers.

In general in FIG. 2, fabric bridge receives eviction requests from processor 104, issues corresponding acknowledgement messages to processor 104 responsive to accepting each eviction request. Fabric bridge 106 also generates a write request via a fabric to a media controller corresponding to each received accepted request. Fabric bridge 106 tracks each outstanding write request until fabric bridge 106 receives a write completion acknowledgement for that outstanding write request.

In some examples, processor 104 may issue a barrier instruction, as described above. The barrier instruction causes processor 104 to wait for all prior eviction requests preceding the barrier instruction to finish execution before executing any instructions after the barrier. For each eviction request, processor 104 tracks corresponding acceptance messages to determine whether the data from pending eviction requests have been accepted by fabric bridge 106. Responsive to determining, based on the received acceptance messages, that all eviction requests issued before the barrier instruction have been accepted by the fabric bridge, processor 104 may issue a read request to register 204 of fabric bridge 106. Processor 104 may issue the register read request as part of a checkpoint sequence. Processor 104 may issue the read request to request an indication from fabric bridge 106 that all pending writes issued via fabric bridge 106 to media controller 108 before fabric bridge 106 accepted the register read request have been persisted by media controller 108.

Fabric bridge 106 receives the register read request. Responsive to receiving the register read request, processor 104 determines which, if any previously-accepted writes are outstanding for processor 104. A group of writes may comprise a single outstanding write or multiple outstanding writes that have not been persisted by media controller 108. A group of associated writes that fabric bridge 106 determines in response to a register read request is referred to herein as an epoch.

Once fabric bridge 106 determines an epoch of associated writes, fabric bridge 106 stores the number of outstanding writes for the epoch in a counter, e.g. counter 208. Fabric bridge 106 decrements counter 208 in response to every received completion acknowledgement of a persisted write belonging to that epoch. Once the counter is equal to zero, fabric bridge 106 determines that all writes from the epoch have been persisted by media controller 108, and fabric bridge 106 transmits a write completion notification to processor 104.

Once processor 104 receives the write completion notification, processor 104 determines that all the writes from the epoch have been persisted to non-volatile memory by media controller 108. Based on the determination that the epoch writes have been persisted by media controller 108, processor 104 allows execution of instructions (e.g. issuing store instructions) that occur after the register read request caused by processor 104 executing a barrier instruction.

A single counter and a single register are illustrated in FIG. 2 for the purpose of example. Multiple counters and registers may be present in fabric bridge 106. For example, fabric bridge 106 simultaneously e.g. in response to receiving multiple register read requests may track multiple epochs. Fabric bridge 106 may store the number of outstanding writes for each in a separate counter or using a separate entry in a counter array.

It should be understood that fabric bridge 106 may reorder write requests to media controller relative to the order that fabric bridge 106 received the corresponding eviction requests. Media controller 108 may also issue write completion messages to fabric bridge 106 in a different order than the order in which media controller 108 received the write requests. Thus, processor 104 may receive acceptance messages and write completion notifications from fabric bridge 106 in a different order than the order in which processor 104 issued the corresponding eviction requests. To ensure proper ordering of instructions and to avoid the register read request being accepted by fabric bridge 106 before any earlier-issued eviction requests, processor 104 should issue a register read request after a barrier instruction completes, and following the previously-issued eviction requests.

In the example of FIG. 2, processor 104 issues first eviction request 102, which may comprise a flush or a writeback. Responsive to receiving first eviction request 102, fabric bridge 106 generates first acceptance message 114. First acceptance message 114 indicates that fabric 106 has accepted first write request 102. Also responsive to receiving first eviction request 102, fabric bridge 106 generates a first write request 110. First write request 110 comprises first write data. The first write data may be based on or may comprise the first eviction data. Fabric bridge 106 transmits first write request 110 to media controller 108 via posting fabric 107. First write request 110 also comprises an identifier that identifies first write request 110 to fabric bridge 106.

At some other time (e.g. before or after issuing first eviction request 102), processor 104 issues second eviction request 116 comprising second eviction data. Fabric bridge 106 receives second eviction request 116 comprising the second eviction data. Responsive to receiving the second eviction request 116, fabric bridge 106 generates second acceptance message 120 and transmits second acceptance message 120 to processor 104.

Also responsive to receiving second eviction request 118, fabric bridge 106 generates a second write request 118 based on the second eviction data. Second write request 118 also comprises an identifier so that fabric bridge 106 may track acknowledgements received from media controller 108 to determine when or if second write request 118 has been persisted to non-volatile storage. Fabric bridge 106 transmits second write request 118 via posting fabric 107 to media controller 108. Fabric bridge 106 may determine that second write request 118 has been persisted by examining write completion acknowledgements received from media controller 108. If a received write completion acknowledgement has the same identifier as second write request 118, fabric bridge 106 determines that second write request 118 has been persisted by media controller 108.

In the example of FIG. 2, after issuing first eviction request 102 and second eviction request 116, processor 104 may execute a checkpoint sequence comprising a barrier instruction and a register read instruction to ensure that first eviction request 102 and second eviction request 116 have been persisted by media controller 108 before processor 104 issues any additional store instructions. After issuing the barrier instruction, processor 104 may execute and transmit register read request 202 to cause fabric bridge 106 to track all pending eviction requests and writes to fabric bridge 106 that have not been persisted, e.g. first write request 110 and second write request 118. Responsive to receiving register read request 202, fabric bridge 106 determines an epoch comprising a group of outstanding writes.

In the example of FIG. 2, first write request 110 and second write request 118 may not have been persisted or accepted by media controller 108 at the time of issuance of register read request 202. Fabric bridge 106 associates first write request 110 and second write request 118 in an epoch. Fabric bridge 106 stores the number of outstanding writes, two in this example, in counter 208. Fabric bridge 106 then waits for write completion acknowledgements to be received from media controller 108 indicating that media controller 108 accepted first write request 110. Responsive to receiving a write acknowledgement, e.g. first write completion acknowledgement 210 or second write completion acknowledgement 212, fabric bridge 106 determines an identifier from the completion acknowledgement. If the identifier corresponds to one of the writes of the currently-tracked epoch, fabric bridge 106 decrements the value of counter 208.

Responsive to receiving write completion acknowledgements for both write request 110 and second write request 118 and read register request 202, fabric bridge 106 transmits write completion notification 206 to processor 104. Write completion notification 206 indicates to processor 104 that all pending writes to posting fabric 107 that were pending before the last-issued register read request, i.e. register read request 202, have persisted been persisted by media controller 108.

Figure 3:
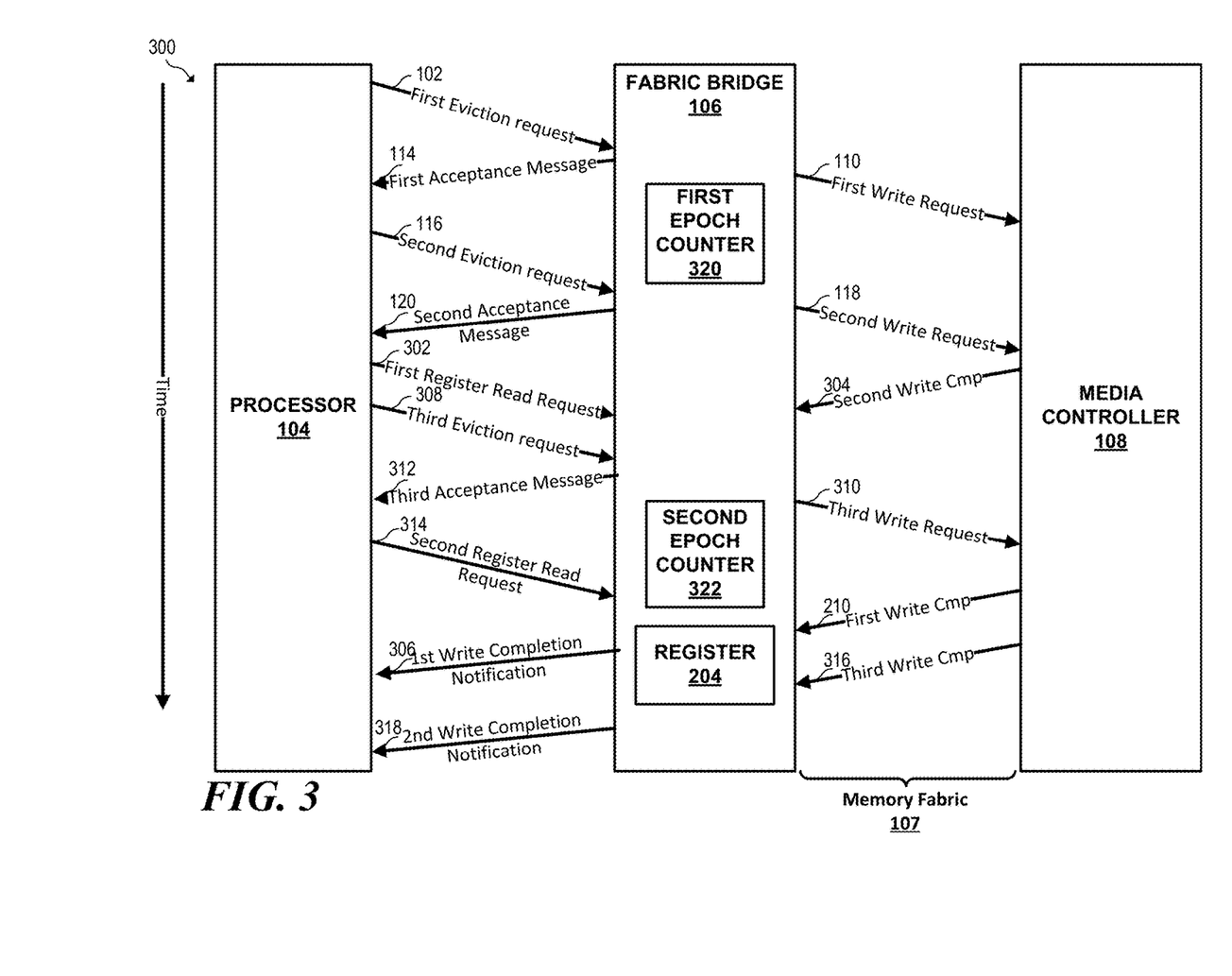
FIG. 3 is a bounce diagram of an example computing system for issuing write request to a fabric.

FIG. 3 is a bounce diagram of another example computing system 300 for issuing write requests to a fabric. System 300 may be similar to system 100 or system 200. System 300 comprises a processor 104, fabric bridge 106, and a posting fabric 107. In the example of FIG. 3, fabric bridge 106 comprises a first epoch counter 320 and a second epoch counter 322. Although two epoch counters are illustrated, fabric bridge 106 may comprise more than two counters. Fabric bridge 106 may also comprise more than one register.

FIG. 3 illustrates an example in which fabric bridge 106 receives two register read requests. Based on the first register read request, fabric bridge 106 assigns the writes that were accepted by the fabric bridge 106, before the first register read request was accepted, to a first epoch. Fabric bridge 106 tracks the number of outstanding writes with a first epoch counter 320. Responsive to receiving the second register read request, fabric bridge 106 assigns a second group of writes, which were accepted by fabric bridge 106 after the first register read request, and before the second register read request was accepted, to a second epoch. Fabric bridge 106 tracks the number of outstanding writes of the second epoch in a second epoch counter. Fabric bridge 106 issues a write completion notification to processor 104 responsive to determining that the writes of the first epoch or the second epoch have persisted, e.g. if the value of the corresponding epoch counter is equal to zero.

Fabric bridge 106 examines write completion acknowledgements received from media controller 108 to determine whether a persisted write belongs to an epoch currently being tracked. If processor 104 determines, based on an identifier in a write completion acknowledgement, e.g. an identifier in first write completion acknowledgement 210, second write completion acknowledgement 304, or third write completion acknowledgement 316, that a write completion acknowledgement has been received for a currently tracked epoch, fabric bridge 106 decrements the counter that indicates the number of pending writes for that epoch.

In the example of FIG. 3, the writes of the second epoch do not depend on writes of the first epoch to complete for the writes of the second epoch to proceed. Processor 104 executes first and second checkpoint sequences to receive first and second notifications of when the writes of the first epoch, and the writes of the second epoch complete.

More particularly, in the example of FIG. 3, processor 104 issues first eviction request 102, which may comprise a flush or a writeback. Responsive to receiving first eviction request 102, fabric bridge 106 generates first acceptance message 114. Also responsive to receiving first eviction request 102, fabric bridge 106 generates a first write request 110. First write request 110 comprises first write data. The first write data may be based on, or may comprise the first eviction data. Fabric bridge 106 transmits first write request 110 via posting fabric 107 to media controller 108. First write request 110 also comprises an identifier that identifies first write request 110 to fabric bridge 106.

At some other time (e.g. before or after issuing first eviction request 102), processor 104 issues second eviction request 116 comprising second eviction data. Fabric bridge 106 receives second eviction request 116 comprising the second eviction data. Responsive to receiving the second eviction request 116, fabric bridge 106 generates second acceptance message 120 and transmits second acceptance message 120 to processor 104.

Also responsive to receiving second eviction request 116, fabric bridge 106 generates a second write request 118 based on the second eviction data. Fabric bridge 106 transmits second write request 118 to media controller 108 via fabric 107. Second write request 118 also comprises an identifier so that fabric bridge 106 may track acknowledgements received from media controller 108 to determine when or if second write request 118 has been persisted to non-volatile storage.

In the example of FIG. 3, after issuing first eviction message 102 and second eviction request 116, processor 104 may execute a barrier instruction to determine that first eviction request 102 and second eviction request 116 have been accepted by fabric bridge 106. Processor 106 may execute the barrier instruction to ensure that first eviction request 102 and second eviction request 116 have been accepted by fabric bridge 106 so that processor 104 can issue first register read request 302 with the assurance that first register read request 302 will not be accepted by the fabric bridge 106 before either first eviction request 102 or second eviction request 116.

However, before fabric bridge 106 accepts first register read request 302, fabric bridge 106 receives second write completion acknowledgement 304. Responsive to receiving second write completion acknowledgement 304, fabric bridge 106 decrements first epoch counter 320. FIG. 3 illustrates an example in which fabric bridge 106 receives write completion acknowledgements in a different order than the order in which writes were accepted by media controller 108. More particularly, FIG. 3, fabric bridge 106 receives second write completion 304 before receiving first write completion 210.

Responsive to finishing execution of the first barrier instruction, processor 104 may execute and transmit first register read request 302 to cause fabric bridge 106 to track all pending writes to media controller 108 that may have not been persisted, e.g. first write request 110. Responsive to receiving register read request 302, fabric bridge 106 determines an epoch comprising the outstanding writes that were accepted before first register read request 302, i.e. first write request 110. Fabric bridge 106 stores the number of outstanding writes in first epoch counter 320.

At some other time after fabric bridge 106 accepts first register read request 302, processor 104 generates and transmits third eviction request 308 to fabric bridge 106. Third eviction request comprises third eviction data. Responsive to receiving first eviction request 102, fabric bridge 106 generates third acceptance message 312. Responsive to receiving third eviction request 308, fabric bridge 106 also generates and transmits third write request 310 via fabric 107 to media controller 108. Third write request 310 comprises third write data, which may be based on the third eviction data of third eviction request 308.

At some time after transmitting third eviction request 308 to fabric bridge 106, processor 104 may execute a barrier instruction before generating second register read request 314. Processor 104 may execute the barrier instruction to ensure that third eviction request 308 is accepted by fabric bridge 106 before second register read request 314 is accepted by fabric bridge 106.

After executing the barrier instruction, processor 104 transmits second register read request 314 to fabric bridge 106. Second register read request 314 causes fabric bridge 106 to determine all outstanding writes (i.e. write 310)

corresponding to eviction request 308 that fabric bridge 106 has accepted since fabric bridge 106 last accepted a register read instruction. In the example of FIG. 3, third write request 310 is the single outstanding write request whose corresponding eviction request 308 was accepted by fabric bridge 106 since receiving the previous register read request, i.e. first register read request 302.

Responsive to receiving second register read request 314, processor 104 assigns third write request 310 to a second epoch and stores the number of outstanding writes for the epoch, i.e. one outstanding write, in second epoch counter 322.

After fabric bridge 106 receives second register read request 314, fabric bridge 106 receives first write completion acknowledgement 210. First write completion acknowledgement 210 was accepted by fabric bridge 106 before fabric bridge 106 accepted second eviction request 116, and thus belongs to the first epoch. Accordingly, responsive to receiving first write completion acknowledgement 210, fabric bridge 106 decrements first epoch counter 320.

Because fabric bridge 106 has received both write completion acknowledgements corresponding to writes of the first epoch, and first epoch counter has been decremented to zero, fabric bridge 106, issues first write completion notification 306 to processor 104.

At some time after fabric bridge 106 receives first write completion acknowledgement 210, fabric bridge 106 receives third completion 316. Fabric bridge 106 determines that third write completion 316 is associated with the second epoch, e.g. based on an identifier in third write completion acknowledgement 316, and decrements second epoch counter 322 from a value of one to a value of zero. Responsive to determining that second epoch counter 322 is equal to zero, and that all writes of the second epoch have been persisted, fabric bridge 106 issues second write completion notification 318 to processor 104.

Figure 4:
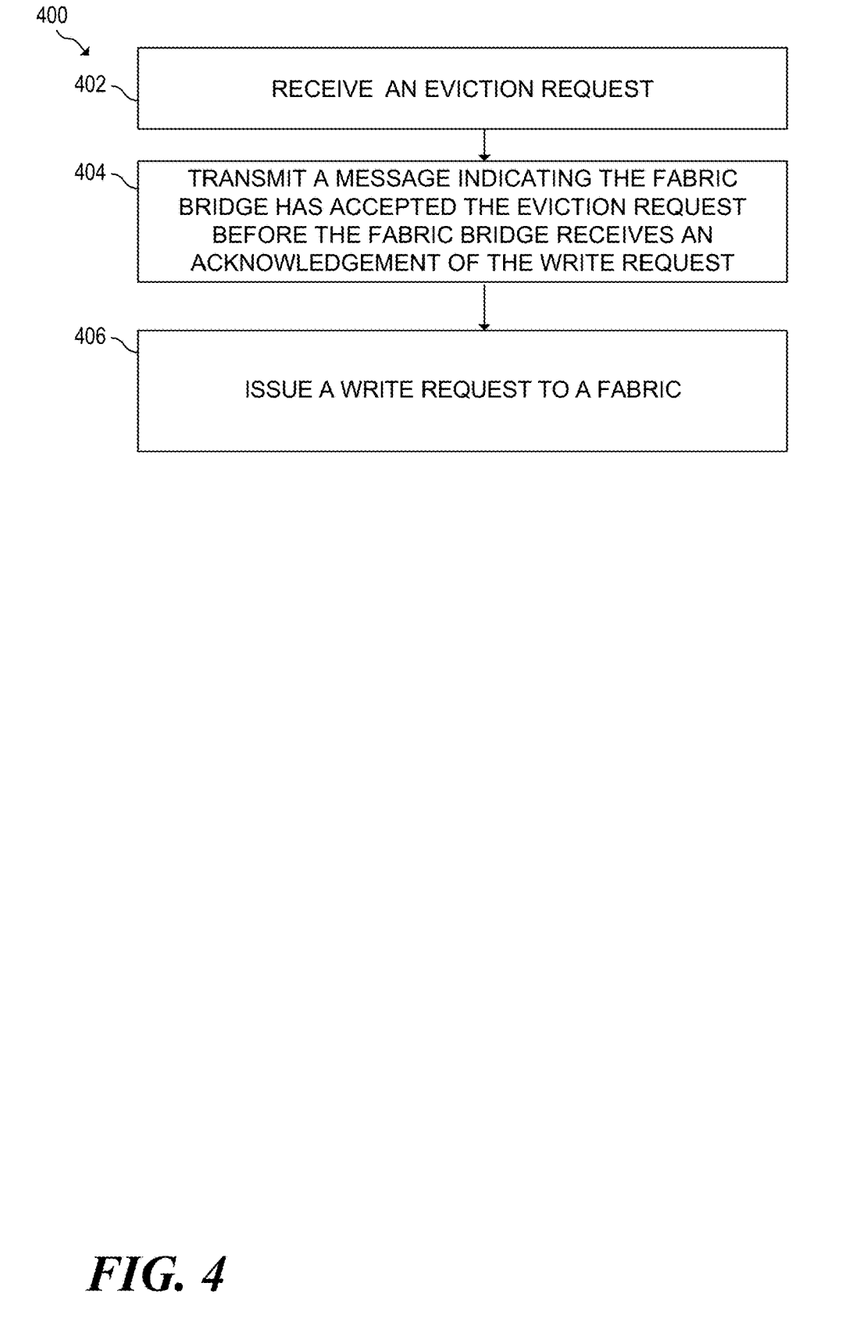
FIG. 4 is a flowchart of an example method for issuing write requests to a fabric.

FIG. 4 is a flowchart of an example method 400 for issuing write requests to a fabric. Method 400 may be described below as being executed or performed by a system, for example, system 100 of FIG. 1, system 200 of FIG. 2, or computing system 300 of FIG. 3. Other suitable systems and/or computing devices may be used as well. Method 400 may be implemented in the form of executable instructions stored on at least one machine-readable (e.g. a non-transitory) storage medium of the system and executed by at least one processor of the system (e.g. fabric bridge 106).

Alternatively or in addition, method 400 may be implemented in the form of electronic circuitry (e.g., hardware). In various examples, method 400 may be implemented in logic, or executed by an ASIC, FPGA, or any combination thereof. In alternate examples of the present disclosure, one or more blocks of method 400 may be executed substantially concurrently or in a different order than shown in FIG. 4. In alternate examples of the present disclosure, method 400 may include more or fewer blocks than are shown in FIG. 4. In some examples, one or more of the blocks of method 400 may, at certain times, be ongoing and/or may repeat.

Method 400 may start at block 402 at which point, as described above, a fabric bridge (e.g. fabric bridge 106) may receive, from a processor (e.g. processor 104) an eviction request comprising eviction data. At block 404, the method further comprises transmitting, by the fabric bridge, a message to the processor indicating the fabric bridge has accepted the eviction request and before the fabric bridge receives an acknowledgement of the write request from the fabric. At block 406, responsive to receiving the eviction request, fabric bridge 106 may issue a write request comprising write data to non-posting fabric 106.

Figure 5:
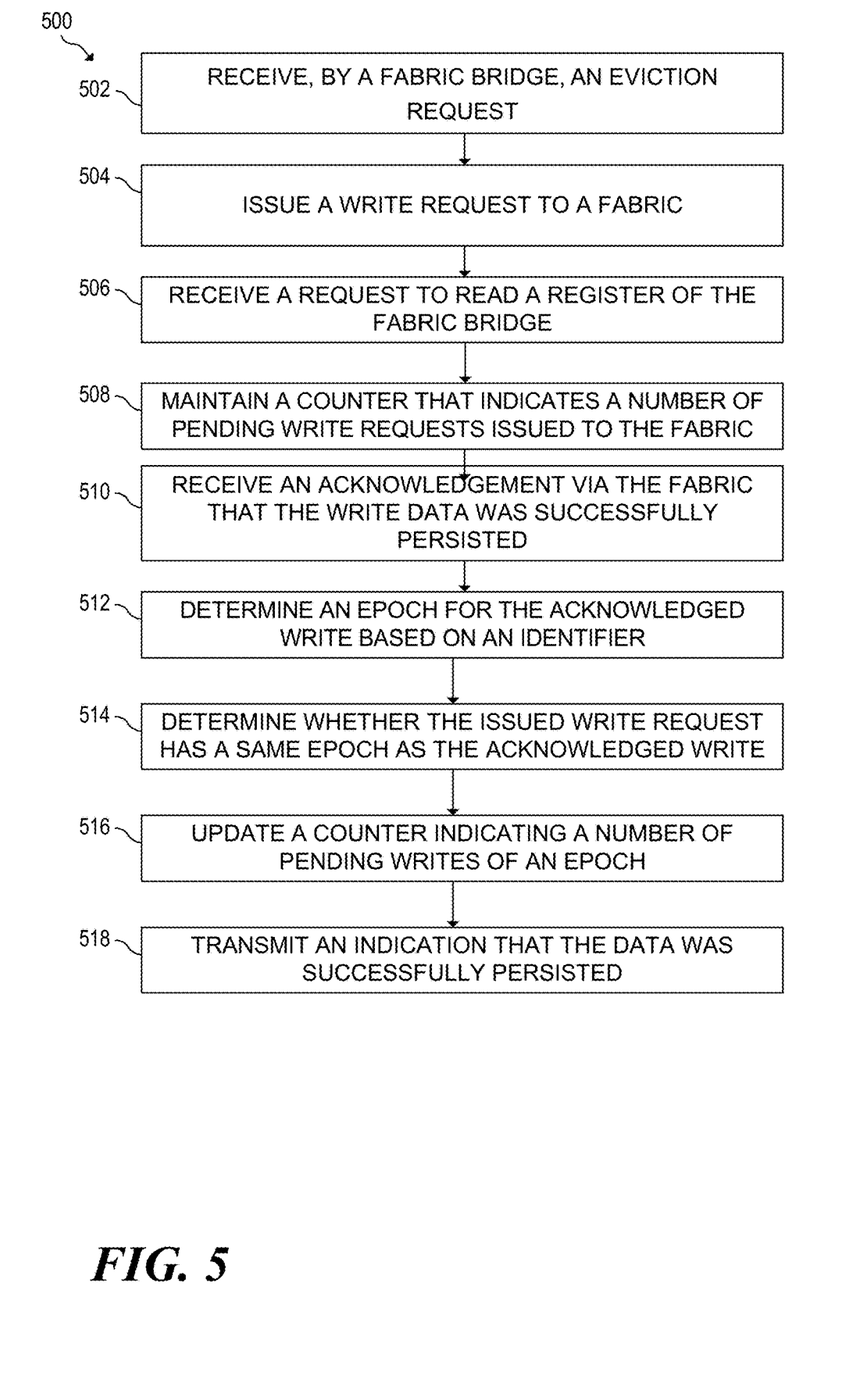
FIG. 5 is flowchart of another example method issuing write requests to a fabric.

FIG. 5 is a flowchart of another example method 500 for issuing write requests to a fabric. Method 500 may be described below as being executed or performed by a system or device, for example, computing system 100 of FIG. 1, computing system 200 of FIG. 2, or computing system 300 of FIG. 3. Other suitable systems and/or computing devices may be used as well. Method 500 may be implemented in the form of executable instructions stored on at least one machine-readable storage medium of the system and executed by at least one processor of the system.

Alternatively or in addition, method 500 may be implemented in the form of electronic circuitry (e.g., hardware). In alternate examples of the present disclosure, one or more blocks of method 500 may be executed substantially concurrently or in a different order than shown in FIG. 5. In alternate examples of the present disclosure, method 500 may include more or fewer blocks than are shown in FIG. 5. In some examples, one or more of the blocks of method 500 may, at certain times, be ongoing and/or may repeat.

Method 500 may start at block 502 at which point a processor, e.g. as described above, a fabric bridge (e.g. fabric bridge 106) may receive, from a processor (e.g. processor 104) an eviction request comprising eviction data. In some examples, the fabric bridge may receive an additional eviction request.

At block 504, responsive to receiving the eviction request, fabric bridge 106 may issue a write request comprising write data to non-posting fabric 106. In the examples in which the fabric bridge receives a second eviction request, the processor may transmit an additional write request based on the additional eviction request via the fabric to a media controller coupled to non-volatile storage. In various examples, the fabric bridge may track the issued write request until the issued write request is persisted. In various examples the fabric bridge may track write requests associated with a same processing core.

At block 506, the method may further comprise receiving, from the processor, a request to read a register of the fabric bridge. At block 508, the fabric bridge may maintain a counter that indicates a number of pending write requests issued to the fabric. At block 510, the fabric bridge may receive, via the fabric and from the media controller, an acknowledgement that the write data was successfully persisted by the media controller.

At block 512, the fabric bridge may determine an epoch for the acknowledged write based on an identifier. At block 514, responsive to receiving the acknowledgement, the fabric bridge may determine whether the issued write request has a same epoch as the acknowledged write.

At block 516, the method may further comprise updating a counter indicating a number of pending writes of an epoch if an epoch of the persisted write has the same epoch as the issued write request. In various examples, the fabric bridge may determine whether an epoch of the additional write request and an epoch of the write request are a same epoch, and may update a counter indicating a number of pending writes of the epoch of the write request if the epoch of the additional write request and the epoch of the write request are the same epoch.

At block 518, responsive to receiving the acknowledgement and to receiving the read request: the method may comprise transmitting, by the fabric bridge and to the processor, an indication that the data was successfully persisted (e.g. to non-volatile storage).

Figure 6:
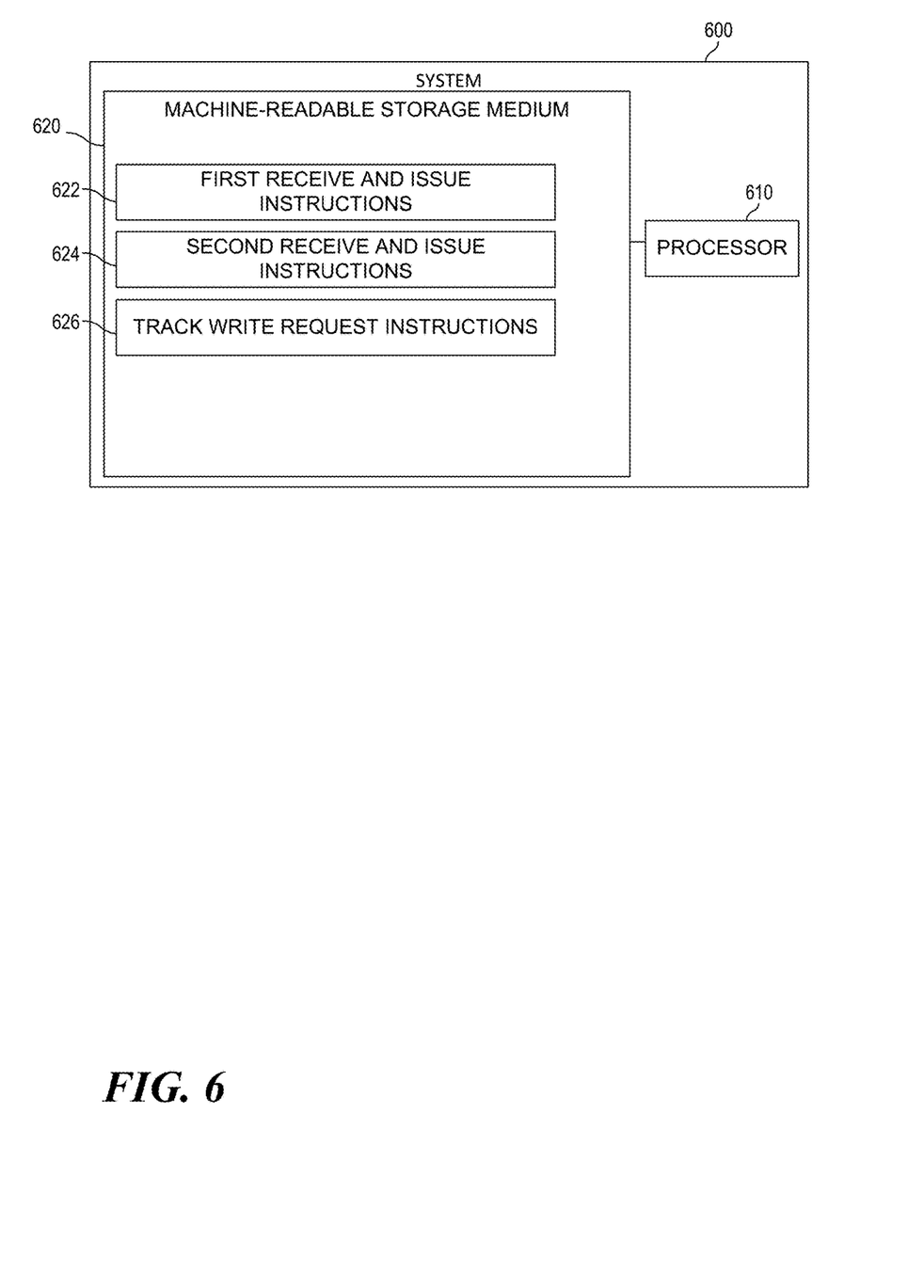
FIG. 6 is a block diagram of an example system for issuing write requests to a fabric.

FIG. 6 is a block diagram of an example system for issuing write requests to a fabric. System 600 may be similar to system 100 of FIG. 1, system 200 of FIG. 2, or system 300 of FIG. 3, as examples. In the example of FIG. 6, system 600 includes a processor 610 and a machine-readable storage medium 620. Processor 610 may comprise fabric bridge 106 in some examples.

Storage medium 620 is non-transitory in various examples. Although the following descriptions refer to a single processor and a single machine-readable storage medium, the descriptions may also apply to a system with multiple processors and multiple machine-readable storage mediums. In various examples, the instructions may be distributed (e.g., stored) across multiple machine-readable storage mediums and the instructions may be distributed (e.g., executed by) across the multiple processors.

Processor 610 may be one or more central processing units (CPUs), logic, microprocessors, ASIC(s), FPGA(s), and/or other hardware devices suitable for retrieval and execution of instructions stored in machine-readable storage medium 620. In the particular examples shown in FIG. 6, processor 610 may fetch, decode, and execute instructions 622, 624, 626 to issue write request to a fabric. As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 620 may be any electronic, magnetic, optical, or other physical storage device that stores executable instructions. Thus, machine-readable storage medium 620 may be, for example, Random Access Memory (RAM), an Electrically-Erasable Programmable Read-Only Memory (EEPROM), a storage drive, an optical disc, and the like. Machine-readable storage medium 620 may be disposed within system 600, as shown in FIG. 6. In this situation, the executable instructions may be "installed" on the system 600. Alternatively, machine-readable storage medium 620 may be a portable, external or remote storage medium, for example, that allows system 600 to download the instructions from the portable/external/remote storage medium. In this situation, the executable instructions may be part of an "installation package". As described herein, machine-readable storage medium 620 may be encoded with executable instructions to allow sharing of USB ports.

Referring to FIG. 6, first receive and issue instructions 622, when executed by a processor (e.g., 610), may cause processor 610 to: receive, by a fabric bridge, a first plurality of eviction requests from a first processor. First receive and issue instructions 622 may further cause processor 610 to, responsive to receiving each of the first eviction requests: issue, by the fabric bridge, a first plurality of messages indicating that each of the first eviction requests were accepted by the fabric bridge, issue, by the fabric bridge, a first plurality of write requests to the fabric, wherein each of the first plurality of write requests correspond to each of the first plurality of eviction requests.

Second receive and issue instructions 624, when executed by a processor (e.g., 610), may cause processor 610 to: receive, by a fabric bridge, a second plurality of eviction requests from a second processor. Second receive and issue instructions 624 may further cause processor 610 to, responsive to receiving each of the second eviction requests: issue, by the fabric bridge, a second plurality of messages indicating that each of the second eviction requests were accepted by the fabric bridge, issue, by the fabric bridge, a second plurality of write requests to the fabric, wherein each of the second plurality of write requests correspond to each of the second plurality of eviction requests.

Track write request instructions 626, when executed, may cause processor 610 to track the second plurality of the second write requests until each of the second write requests are persisted.

Figure 7:
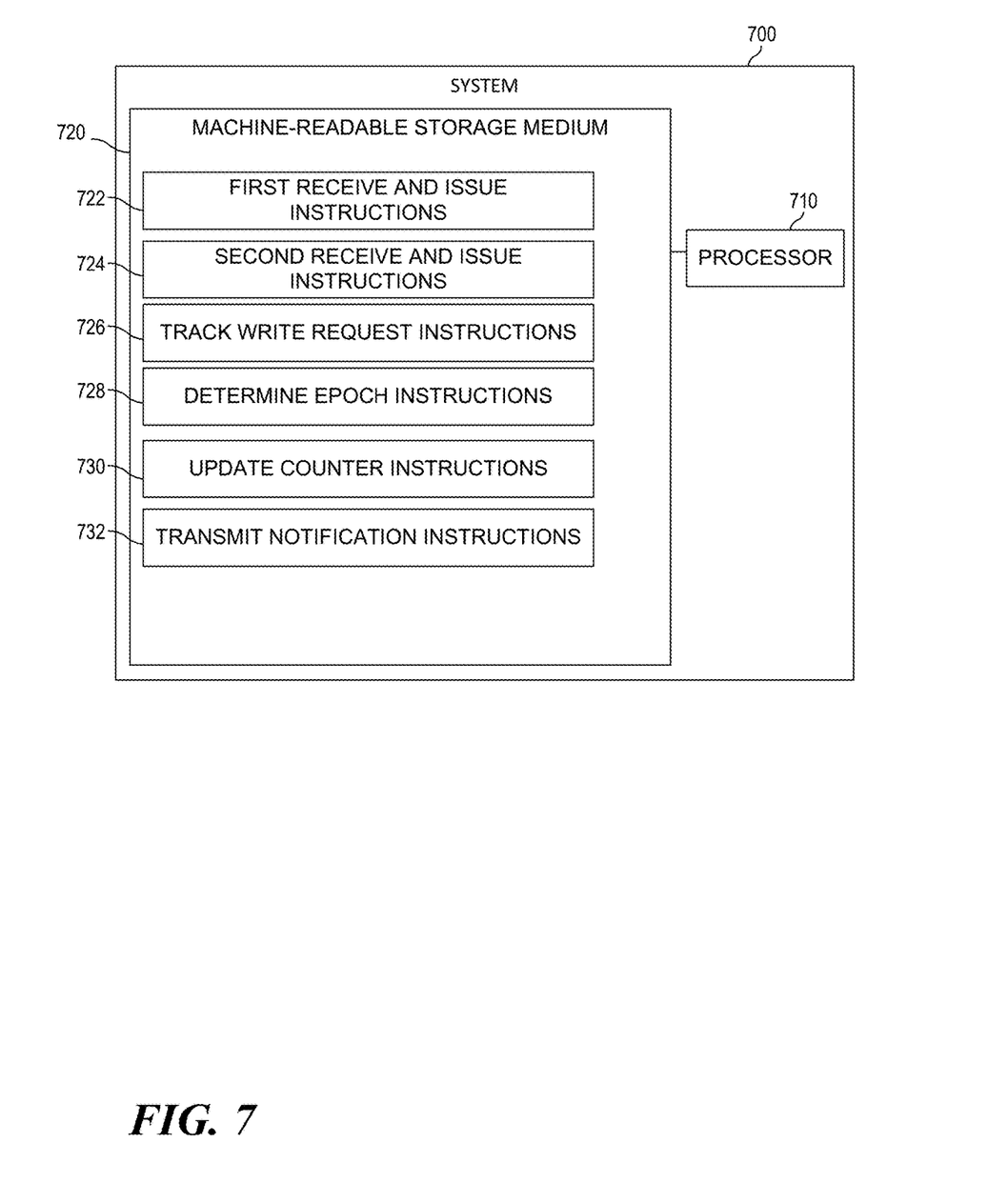
FIG. 7 is a block diagram of an example system for issuing write requests to a fabric.

FIG. 7 is a block diagram of an example system for issuing write request to a fabric. System 700 may be similar to system 100 of FIG. 1 system 200 of FIG. 2, or system 300 of FIG. 3 for example. In the example of FIG. 7, system 700 includes a processor 710 and a machine-readable storage medium 720. In some examples, processor 710 may comprise a fabric bridge (e.g. fabric bridge 106). In some examples, chassis manager 110 may comprise logic and may not comprise processor 710.

Storage medium 720 is non-transitory in various examples. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 710 may be one or more central processing units (CPUs), FGPAs, ASICs, digital signal processors (DSPs), microprocessors, and/or other hardware devices suitable for retrieval and execution of instructions stored in machine-readable storage medium 720. In the particular examples shown in FIG. 7, processor 710 may fetch, decode, and execute instructions 722, 724, 726, 728, 730, 732, to issue write requests to a fabric. As an alternative or in addition to retrieving and executing instructions, processor 710 may include one or more electronic circuits comprising a number of electronic components for performing the functionality of one or more of the instructions in machine-readable storage medium 720. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 720 may be any electronic, magnetic, optical, or other physical storage device that stores executable instructions. Thus, machine-readable storage medium 720 may be, for example, Random Access Memory (RAM), an Electrically-Erasable Programmable Read-Only Memory (EEPROM), a storage drive, an optical disc, and the like. Machine-readable storage medium 720 may be disposed within system 700, as shown in FIG. 7. In this situation, the executable instructions may be "installed" on the system 700. Alternatively, machine-readable storage medium 720 may be a portable, external or remote storage medium, for example, that allows system 700 to download the instructions from the portable/external/remote storage medium. In this situation, the executable instructions may be part of an "installation package". As described herein, machine-readable storage medium 720 may be encoded with executable instructions to allow sharing of USB ports.

Referring to FIG. 7, first receive and issue instructions 722, when executed by a processor (e.g., 710), may cause processor 710 to: receive, by a fabric bridge, a first plurality of eviction requests from a first processor. First receive and issue instructions 722 may further cause processor 710 to, responsive to receiving each of the first eviction requests: issue, by the fabric bridge, a first plurality of messages indicating that each of the first eviction requests were accepted by the fabric bridge, issue, by the fabric bridge, a first plurality of write requests to the fabric, wherein each of the first plurality of write requests correspond to each of the first plurality of eviction requests.

Second receive and issue instructions 724, when executed by a processor (e.g., 710), may cause processor 710 to: receive, by a fabric bridge, a second plurality of eviction requests from a second processor. Second receive and issue instructions 724 may further cause processor 710 to, responsive to receiving each of the second eviction requests: issue, by the fabric bridge, a second plurality of messages indicating that each of the second eviction requests were accepted by the fabric bridge, issue, by the fabric bridge, a second plurality of write requests to the fabric. Each of the second plurality of write requests may correspond to each of the second plurality of eviction requests.

Track write request instructions 726, when executed, may cause processor 710 to track the second plurality of the second write requests until each of the second write requests are persisted. In various examples, track write instructions 726 may cause processor 710 to receive a first request to read a status register, and receive a second request to read a status register. In various examples, track write request instructions 726 may cause processor 710 to receive, via the fabric, an acknowledgement for a persisted write request, the acknowledgement comprising an identifier.

Determine epoch instructions 728, when executed, may cause processor 710 to assign the first plurality of writes to a first epoch and assign the second plurality of writes to a second epoch. In some examples, determine epoch instructions 728 may cause processor 710 to determine whether the first and second pluralities of write requests have a same epoch. In some examples, determine epoch instructions 728 may cause processor 710 to determine an epoch of the persisted write based on an identifier of the persisted write, and determine whether one of the first pluralities of writes and the second pluralities of writes have persisted based on the determined epoch.

In some examples, update counter instructions 730, when executed, may cause processor 710 to decrement a first counter associated with the first epoch responsive to receiving an acknowledgement via the fabric for one of the first plurality of writes, and decrement a second counter associated with the second epoch responsive to receiving an acknowledgement via the fabric for one of the second plurality of writes.

In some examples, update counter instructions 730, when executed, may cause processor 710 to update a first counter indicating a number of pending writes of the same epoch of if the first plurality of writes and the second plurality of writes have the same epoch, and update the first counter corresponding to a number of pending writes of an epoch of the first pluralities of writes and a second counter corresponding to a number of pending writes of an epoch of the second pluralities of writes if the first pluralities of writes and the second pluralities of writes do not have the same epoch.

Processor 710 may execute transmit notification instructions 732. Transmit notification instructions 732, when executed, cause processor 710 to transmit a first notification to the processor (e.g. processor 104) indicating the first plurality of write requests have persisted.

The invention claimed is:

1. A method comprising:
receiving from a processor, by a fabric bridge, an eviction request comprising eviction data;
responsive to receiving the eviction request:
before receiving an acknowledgement of a write request from a fabric, transmitting, by the fabric bridge, a message to the processor indicating the fabric bridge has accepted the eviction request; and
issuing, by the fabric bridge, the write request comprising write data to a non-posting fabric;
assigning the write request to a first epoch;
decrementing a first counter associated with the first epoch responsive to receiving an acknowledgement via the fabric for the write request;
receiving from a second processor, by a fabric bridge, a second eviction request comprising eviction data;
responsive to receiving the second eviction request:
before receiving a second acknowledgement of a second write request from the fabric, transmitting, by the fabric bridge, a second message to the second processor indicating the fabric bridge has accepted the second eviction request; and
issuing, by the fabric bridge, the second write request comprising second write data to the non-posting fabric;
assigning the second write request to a second epoch:
decrementing a second counter associated with the second epoch responsive to receiving a second acknowledgement via the fabric for the second write request.

2. The method of claim 1 comprising:
receiving from the processor, by the fabric bridge, a request to read a register of the fabric bridge;
receiving, by the fabric bridge and via the fabric, an acknowledgement that the write data was successfully persisted; and
responsive to receiving the acknowledgement that the write data was successfully persisted and to receiving the read request:
transmitting, by the fabric bridge and to the processor, an indication that the data was successfully persisted.

3. The method of claim 2, comprising:
tracking the issued write request until the write data comprising the issued write request has persisted.

4. The method of claim 2, comprising:
maintaining, by the fabric bridge, a counter that indicates a number of pending write requests issued to the fabric,
wherein transmitting the message indicating that the indication that the data was successfully persisted comprises:
transmitting, by the fabric bridge, the indication to the processor responsive to determining that the counter is equal to zero.

5. The method of claim 2 comprising:
tracking, by the fabric bridge, write requests associated with a same processing core,
wherein transmitting the indication that the write persisted comprises transmitting the indication that all the write requests associated with the same processing core have persisted.

6. The method of claim 1, comprising:
receiving an acknowledgement, by the fabric bridge via the fabric, that data was successfully persisted; and responsive to receiving the acknowledgement that the data was successfully persisted:
  determining, by the fabric bridge, whether the issued write request has a same epoch as the acknowledged write; and
  updating, by the fabric bridge, a counter indicating a number of pending writes of the epoch if an epoch of the persisted write has the same epoch as the issued write request.

7. The method of claim 1, comprising:
receiving, by the fabric bridge and from the processor, an additional eviction request;
transmitting, by the fabric bridge and to the fabric, an additional write request based on the additional eviction request;
determining, by the fabric bridge, whether an epoch of the additional write request and an epoch of the write request are a same epoch; and
updating, by the fabric bridge, a counter indicating a number of pending writes of the epoch of the write request if the epoch of the additional write request and the epoch of the write request are the same epoch.

8. A system comprising:
a processor;
a memory fabric; and
a fabric bridge, the fabric bridge coupled to the memory fabric and the processor, the fabric bridge to:
receive, from the processor a first eviction request comprising first eviction data;
transmit, to the processor, a message indicating the fabric bridge has accepted the first eviction request;
transmit a first write comprising the first eviction data to the fabric;
receive, from the processor, a second eviction request comprising second eviction data;
transmit a second write comprising the second eviction data to the fabric; and
responsive to transmitting the second write request:
  transmit, to the processor, a message indicating the fabric bridge accepted the second eviction request;
determine that the first write and the second write have persisted, wherein to determine whether the first write and the second write have persisted, the fabric bridge to:
  store, in a counter, a number of pending writes issued to the fabric;
  decrement the counter responsive to receiving an indication via the fabric that one of the pending writes has persisted;
responsive to receiving a request to read a status register of the fabric bridge:
  assign the first write and the second write to an epoch;
  track a first number of pending writes in the first epoch with a first counter;
receive a third eviction request comprising third eviction data;
transmit a third write request comprising the third eviction data to the fabric;
receive a second read request for a status register of the fabric bridge;
responsive to receiving the second read request:
  assign the third write request to a second epoch; and
  track a second number of pending writes in the second epoch with a second counter;
transmit, to the processor, a notification to the processor responsive to determining that the first write and the second write have persisted wherein the notification indicates that the first write and the second write have persisted responsive to the counter being equal to zero.

9. The system of claim 8, the fabric bridge to:
receive, from the fabric bridge, a request to read a register of the fabric bridge;
responsive to receiving the read request and responsive to determining that the first write and the second write have persisted:
  transmit the notification, by the fabric bridge and to the processor, that the first write and the second write have persisted.

10. The system of claim 9, the fabric bridge to:
receive an acknowledgement of a write from the fabric, the acknowledgement comprising an identifier;
determining an epoch for the acknowledge write based on the identifier; and
determine whether the first write and the second write have persisted based on the determined epoch.

11. The system of claim 8, wherein the fabric bridge to:
receive an acknowledgement, via the fabric, of the first write;
responsive to receiving the acknowledgement of the first write:
  update a counter indicating a number of pending writes of an epoch of the first write and the second write.

12. The system of claim 8, wherein the fabric bridge to:
determine whether the first write, and the second write, have a same epoch; and
update a first counter indicating a number of pending writes of the same epoch of if the first write and the second write have the same epoch; and
update the first counter corresponding to a number of pending writes of an epoch of the first write and a second counter corresponding to a number of pending writes of an epoch of the second write if the first write and the second write do not have the same epoch.

13. A non-transitory computer-readable storage medium storing instructions thereon that, when executed, cause a processor to:
receive, by a fabric bridge, a first plurality of eviction requests from a first processor;
responsive to receiving each of the first eviction requests:
  issue, by the fabric bridge, a first plurality of messages indicating that each of the first eviction requests were accepted by the fabric bridge; and
  issue, by the fabric bridge, a first plurality of write requests to the fabric, wherein each of the first plurality of write requests correspond to each of the first plurality of eviction requests;
receive, by a fabric bridge, a second plurality of eviction requests from a second processor;
assign the first plurality of writes to a first epoch;
decrement a first counter associated with the first epoch responsive to receiving an acknowledgement via the fabric for one of the first plurality of writes;
responsive to receiving each of the second eviction requests:
  issue, by the fabric bridge, a second plurality of messages indicating that each of the second eviction requests were accepted by the fabric bridge; and
  issue, by the fabric bridge, a second plurality of write requests to the fabric, wherein each of the second plurality of write requests correspond to each of the second plurality of eviction requests;
assign the second plurality of writes to a second epoch;

decrement a second counter associated with the second epoch responsive to receiving an acknowledgement via the fabric for one of the second plurality of writes;

track the first plurality of write requests until each of the first write requests have persisted; and track the second plurality of the second write requests until each of the second write requests have persisted.

14. The non-transitory computer-readable storage medium of claim 13, comprising transmit a first notification to the processor indicating the first plurality of write requests have persisted.

15. The non-transitory computer-readable storage medium of claim 14, wherein the instructions that cause the processor to track the first plurality of writes comprise additional instructions that, when executed, cause the processor to receive a first request to read a status register, and wherein the instructions that cause the processor to track the second plurality of writes comprise additional instructions that, when executed, cause the processor to receive a second request to read a status register.

16. The non-transitory computer-readable storage medium of claim 13, comprising instructions that, when executed, cause the processor to:

receive, via the fabric, an acknowledgement for a persisted write request, the acknowledgement comprising an identifier;

determine an epoch of the persisted write request based on the identifier; and determine whether one of the first pluralities of writes and the second pluralities of writes have persisted based on the determined epoch.

17. The non-transitory computer-readable storage medium of claim 13, comprising instructions stored thereon that, when executed, cause the processor to:

determine whether the first pluralities of writes, and the second pluralities of writes have a same epoch; and update a first counter indicating a number of pending writes of the same epoch of if the first plurality of writes and the second plurality of writes have the same epoch; and update the first counter corresponding to a number of pending writes of an epoch of the first pluralities of writes and a second counter corresponding to a number of pending writes of an epoch of the second pluralities of writes if the first pluralities of writes and the second pluralities of writes do not have the same epoch.

* * * * *